United States Patent Office 2,813,868
Patented Nov. 19, 1957

2,813,868
HETEROCYCLIC QUINONES

Hans-Bodo König, Wuppertal-Elberfeld, Germany, assignor to Farbenfabriken Bayer Aktiengesellschaft, Leverkusen, Germany, a corporation of Germany No Drawing. Application January 20, 1956,
Serial No. 560,291

Claims priority, application Germany January 24, 1955

2 Claims. (Cl. 260—267)

The present invention relates to heterocyclic quinones and more particularly to phenazine quinones.

The synthesis of quinones of phenazine has not hitherto been described in the literature.

It is an object of the present invention to provide a process of producing these novel phenazine derivatives. A further object is the provision of the new phenazine quinones which are useful as intermediates for dyestuffs, drugs, pest control agents and the like. Further objects will become apparent from the following specification.

It has been found that 1.4-dihydroxyphenazine may be oxidised to the corresponding phenazine quinone by using as oxidising agents the oxides or oxygen acids of halogens, preferably bromic acid or its salts. If instead of the unsubstituted 1.4-dihydroxyphenazine, its derivatives substituted with halogen atoms, hydroxy, alkoxy, acyloxy or alkyl groups, are used, 1.4-phenazine quinones are obtained which contain the aforesaid substituents singly or in combination.

The bromic acid preferably used according to the present invention as oxidising agent is advantageously employed in the form of its stable alkali metal salts in concentrated aqueous solution. The dihydroxy phenazines may be used as such or as a suspension or solution in a diluent such as for example glacial acetic acid.

In practice, the process is carried out so that an aqueous solution of the oxidizing agent is added to a mixture of dihydroxy phenazine with glacial acetic acid, with stirring, at temperatures ranging from 0–100° C., but preferably at room temperature. The dihydroxy phenazine not immediately dissolved goes into solution after a short time whereupon the corresponding phenazine quinones precipitate in well-defined fine almost analytically pure crystals. The precipitation may be completed by the addition of water and by cooling the reaction mixture.

The compounds obtained according to the invention are intended to be used as dyestuffs, drugs, pest control agents or as intermediates for their preparation.

The following example is given for the purpose of illustrating the invention.

Example 0.5 gram of 1.4-dihydroxy phenazine are dissolved or suspended in 25 milliliters of glacial acetic acid. To this mixture there are added, in one portion, with stirring, a solution of 0.5 gram of potassium bromate in 7 milliliters of water, at room temperature. The reaction mixture is stirred at room temperature for 10 minutes whereupon 10 milliliters of water are added and after 4 minutes another 10 milliliters of water. The mixture is then cooled with ice and after 5 minutes treated again with 10 milliliters of water. After 6 minutes the precipitate thus formed is filtered off with suction, washed with water and dried. Yield: 0.43 gram (87 percent of the theoretical) of fine light-brown crystals. Boiling point above 280° C. (decomposition between 150–200° C.) (Kofler heating bloc).

I claim:

1. The process which comprises contacting in acid solution and at room temperature an alkali metal bromate and a compound of the formula

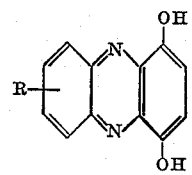

in which R is a member of the group consisting of hydrogen, a halogen atom, an alkyl radical of from 1 to 3 carbon atoms, the hydroxy group, an alkyloxy radical having from 1 to 3 carbon atoms and an acyloxy radical having from 1 to 3 carbon atoms, and recovering from the reaction mixture a compound of the formula

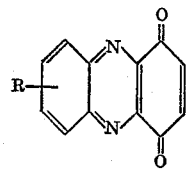

2. The process which comprises contacting in acid solution and at room temperature an alkali metal bromate and 1.4-dihydroxy phenazine and recovering from the reaction mixture 1,4-phenazine quinone.

References Cited in the file of this patent

Leicester, Berichte Deutsche Chemische Gesellschaft, vol. 23, pp. 2793–2796.

Organic Reactions, vol. 4, pp. 355–361.

Smith's Inorganic Chemistry, 2nd ed., page 390.